B. F. Sturtevant,
Rotary Blower,
Nº 70,286.      Patented Oct. 29, 1867.
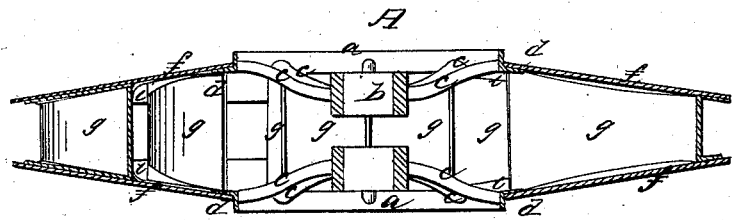
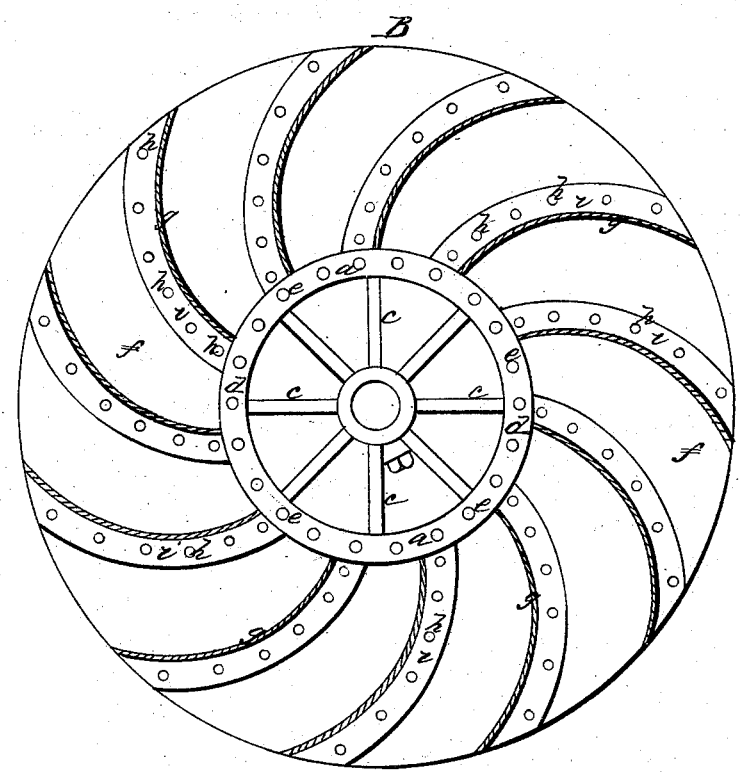
Witnesses.
S. B. Kidder
M. W. Frothingham
Inventor:
B. F. Sturtevant
by
Crosby & Gould
Attys.

United States Patent Office.

B. F. STURTEVANT, OF WEST ROXBURY, MASSACHUSETTS.

Letters Patent No. 70,286, dated October 29, 1867.

IMPROVEMENT IN BLOWER-WHEELS.

The Schedule referred to in these Letters Patent and making part of the same.

TO ALL WHOM IT MAY CONCERN:

Be it known that I, B. F. STURTEVANT, of West Roxbury, in the county of Norfolk, and State of Massachusetts, have invented an improved Pressure-Blower Wheel; and I do hereby declare that the following, taken in connection with the drawings which accompany and form part of this specification, is a description of my invention sufficient to enable those skilled in the art to practise it.

The invention relates to the construction of rotary blowers for blast and cupola-furnaces, &c., or more particularly to the arrangement of the rotary vanes of the wheel, with reference to a casing or side disks, to and between which they are fixed, and with reference to the centre ring, upon which the disks and their blades or spokes are mounted.

The drawings represent a blower-wheel, embodying my invention, A showing a transverse central section, and B a central section between the disks.

$a$ denotes the supporting-ring, itself supported on a boss or hub, $b$, by spokes $c$, this boss being fastened upon the driving-shaft. Each ring $a$ has a peripheral flange, $d$, and upon this is fixed, by rivets $e$, a frusto-conical disk, $f$, the two disks extending out from the ring and in towards each other, as seen at B. These disks, in connection with the rings, sustain a series of blades or air-driving plates, $g$, extending across between the disks, and secured thereto by rivets $h$ passing through flanges $i$ projecting from the opposite edges of each blade. By confining the disks to the rings and the blades to the disks in this manner, the blades are held rigidly and firmly in position, without liability of springing, or of undue strain, or of loosening during their rapid rotation. Instead of extending the blades radially from the hub, or with respect thereto, and giving to the adjacent ones a great divergence, I curve each blade as seen at B, and, placing them in great number between the disks, I so incline the opposite disks towards each other as to contract the size of each wind-passage from its inlet at the centre to its outlet at the periphery of the wheel, so that air drawing into the mouth of any passage, and driven by centrifugal force, is delivered with much greater intensity or pressure from the outlet of the passage than if the size of the passage increased materially from its mouth to the periphery of the wheel, while, by curving the blades as shown, a more direct pressure upon the air is obtained to throw it tangentially from the wheel than where such blades are extended radially from the centre of the wheel, as in the ordinary construction of fan-blowers, for it will be seen that at the outer end of each blade the acting face thereof is nearly square with the outlet, so that to the centrifugal force is added, just at the outlet, this direct sweeping force, to throw the air tangentially from the wheel; and this, in connection with the fact of the division of the wheel into a great number of wind-passages, and of the contraction of each passage towards its outlet, drives the air with greater pressure from the periphery of the wheel than has heretofore been attained with any other blower. Moreover, this wheel is constructed to run in a large chamber, or, as an exhaust apparatus, may discharge into the open air, and the friction of the body of air surrounding the periphery of the wheel has a tendency to draw out the air from each passage, in contradistinction to impeding the discharge of air, as in wheels in which the blades rotate in a close case.

Where blowers have heretofore been constructed with curved arms or blades, such blades have generally been unattached to and unenclosed between side plates or disks, there being no division between them and the sides of the shell or case in which they rotate. This construction is productive of cross or counter eddies from the interior of the case, back through the centre opening, and retards the action of the wheel, the blades having a tendency to discharge the air at their side edges, as well as their outer ends. But by enclosing the blades between the frusto-conical disks, and making such disks a part of the wheel, and by giving to the blades the curved form shown, the air can only escape at the outlet end of the blades, and the friction of the outer surfaces of the disks against the air in the case gives to the air a circular motion with the disks, and impels it through the discharge pipe with the air thrown tangentially from the blades through the outlets.

I claim the arrangement of the blades and the frusto-conical disks relatively to each other and to the flanged rings, substantially as and for the purpose described.

B. F. STURTEVANT.

Witnesses:
   J. B. CROSBY,
   FRANCIS GOULD.